(12) United States Patent
Ozugur et al.

(10) Patent No.: US 7,489,866 B2
(45) Date of Patent: Feb. 10, 2009

(54) METHOD AND APPARATUS FOR MULTIPLE-HOMING ROUTE DIVERSIFICATION FOR UNI CLIENTS

(75) Inventors: Timucin Ozugur, Garland, TX (US); Frederick Skoog, Colleyville, TX (US)

(73) Assignee: Alcatel Lucent, Paris (FR)

( * ) Notice: Subject to any disclaimer, the term of this patent is extended or adjusted under 35 U.S.C. 154(b) by 1093 days.

(21) Appl. No.: 10/426,762

(22) Filed: Apr. 30, 2003

(65) Prior Publication Data

US 2004/0218923 A1   Nov. 4, 2004

(51) Int. Cl.
*H04J 14/00* (2006.01)
(52) U.S. Cl. ...................................................... 398/57
(58) Field of Classification Search ................... 398/57; 709/238–239; 370/351, 389, 216–228
See application file for complete search history.

(56) References Cited

U.S. PATENT DOCUMENTS

| | | | | |
|---|---|---|---|---|
| 6,222,820 B1 * | 4/2001 | Hamami | ................... | 370/218 |
| 6,272,107 B1 * | 8/2001 | Rochberger et al. | ........ | 370/216 |
| 2001/0032271 A1 * | 10/2001 | Allen | ...................... | 709/239 |
| 2003/0189898 A1 * | 10/2003 | Frick et al. | ............... | 370/227 |

OTHER PUBLICATIONS

User Network Interface (UNI) 1.0 Signaling Specification; Implementation Agreement OIF-UNI-01.0; Working Group: ARchitecture, OAM&P, PLL, & Signaling Working Groups; Oct. 1, 2001; pp. 1-120.
Berger, et al.; RSVP Refresh Overhead Reduction Extensions; IETF Network Working Group, RFC 2961; Apr. 2001; pp. 1-34.
Braden, et al.; Resource ReSerVation Protocol (RSVP)—Version 1 Functional Specification; IETF Network Working Group, RFC 2205; Sep. 1997; pp. 1-112.
Berger, et al.; Generalized Multi-Protocol Label Switching (GMPLS) Signaling Functional Description; IETF Network Working Group, RFC 3471; Jan. 2003; pp. 1-7.
Berger, et al.; Generalized Multi-Protocol Label Switching (GMPLS) Signaling Resource ReserVation Protocol-Traffic Engineering (RSVP-TE) Extensions; IETF NEtwork Working Group, RFC 3473; Jan. 2003; pp. 1-42.
Bernstein, G.M., et al "Interdomain Optical Routing," Journal of Optical Networking, 'Online! vol. 1, No. 2, Feb. 2002, pp. 80-92, XP002369711.
Sengupta S et al. "From Network Design to Dynamic Provisioning and Restoration in Optical Cross-Connect Mesh Networks: An Architectural and Algorithmic Overview" IEEE Network, IEEE Service Center, New York, NY, US, vol. 15, No. 4, Jul. 2001, pp. 46-54, XP002250120 ISSN: 0890-8044.

(Continued)

*Primary Examiner*—Jason Chan
*Assistant Examiner*—Quan-Zhen Wang

(57) ABSTRACT

A diversification route (Connection-B) is generated after establishing a first path (Connection-A) through the network (10) between an ingress client node (12) and an egress client node (14) through a first ingress network element (16) within the optical network. Information identifying the first network element is passed by the ingress client node (12) to a second network element (18) in the network. Information identifying the first path and desired diversity type is passed from the second network element (18) to the first network element (16). In response to receiving the information identifying the first path, an entity list associated with the first path is passed from the first network element (16) to the second network element (18). The second path (Connection-B) is established responsive to the information associated with the first path (Connection-A).

10 Claims, 2 Drawing Sheets

OTHER PUBLICATIONS

Dharnikota S et al, "Inter-domain Routing with Shared Risk Groups", IETF Standard-Working-Draft, Internet Engineering Task Force, IETF, CH, Jul. 2001, XP015032068 ISSN: 0000-0004.

Dharanikota, S. et al "Protection and Restoration in DWDM Networks: Recent Developments and Issues" Proceedings of SPIE, Online! Jul. 2002, pp. 254-265, XP002369712.

Rajagopalan B, et al "IP Over Optical Networks: Architectural Aspects" IEEE Communications Magazine, IEEE Service Center, New York, NY US, vol. 38, No. 9, Sep. 2000, pp. 94-120, XP000975326, ISSN: 0163-6804.

Haibo Wen, et al "A New Routing Algorithm Under shared-Risk-Link-Groups Constraints for Optical Networks", Proceedings of SPIE, 'Online! vol. 4910, Sep. 2002, pp. 292-300, XP002369713.

* cited by examiner

MULTIPLE HOMING NETWORK DIVERSITY OBJECT

UNI CONNECTION CREATE REQUEST WITH DIVERSITY EXTENSIONS

DIVERSIFICATION OBJECT WITHIN NOTIFY MESSAGE

DIVERSIFICATION ENTITY LIST WITHIN NOTIFY ACK MESSAGE

US 7,489,866 B2

METHOD AND APPARATUS FOR MULTIPLE-HOMING ROUTE DIVERSIFICATION FOR UNI CLIENTS

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to optical transport networks.

2. Description of the Related Art

DWDM (Dense Wavelength Division Multiplexing) allows a single optical fiber to carry voice and data traffic over a large number of discrete channels (each channel operating on a different wavelength). Because of the efficiency advantages of DWDM, telecommunication service providers are building new networks and replacing old networks with optical systems using this technology.

UNI 1.0 was proposed by OIF (Optical Internetworking Forum) to enable client to dynamically establish optical connections using signaling procedures compatible with Generalized MPLS (GMPLS) signaling. Additionally, UNI 1.0 provides a neighbor discovery mechanism to permit equipment on both ends of a fiber link to identify each other; this allows management systems to build interconnection maps automatically. A service discovery mechanism enables clients to determine the services that are available from the optical network.

UNI 2.0 requires networks to support multiple-homing route diversification. Multiple-homing route diversification provides for the establishment of different paths between ingress and egress UNI clients ("UNI-C's). However, there is no established means of creating a diversified path from an existing path.

One current proposal involves passing diversification information, such as SRLG (shared risk link group), node and link information from the ingress network element (UNI-N) to the ingress client. This proposal, however, involves sending important information regarding the configuration of the network to entities outside of the network. From a security standpoint, transport network providers are against sending network information to external entities.

Accordingly, a need has arisen for a method and apparatus to provide multiple-homing route diversification without divulging proprietary information to external entities.

BRIEF SUMMARY OF THE INVENTION

In the present invention, a diversification route is generated after establishing a first path through the network between an ingress client node and an egress client node through a first ingress network element within the optical network. Information identifying the first network element is passed to a second network element in the network. Information identifying the first path is passed from the second network element to the first network element. In response to receiving information identifying the first path, information associated with the first path is passed from the first network element to the second network element. A second path is established responsive to the information associated with the first path.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-7 of the drawings, like numerals being used for like elements of the various drawings.

Figure 1:
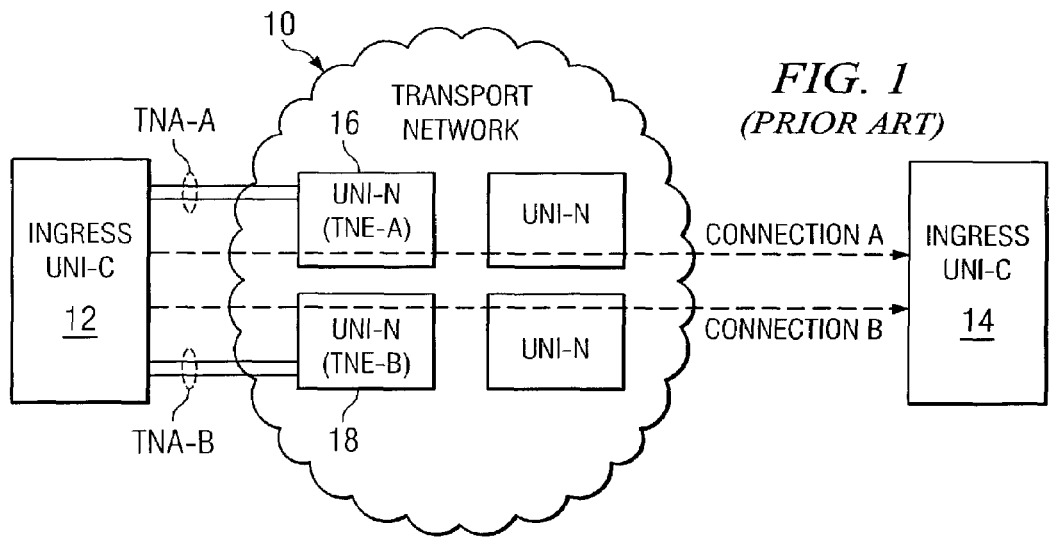
FIG. 1 illustrates a basic diagram of a transport network supporting multiple-homing route diversification between an ingress UNI client and an egress UNI client.

FIG. 1 illustrates a basic diagram of a transport network 10 supporting multiple-homing route diversification between an ingress UNI client 12 and an egress UNI client 14. The ingress UNI client is coupled to multiple ingress network elements, shown in FIG. 1 as UNI-N 16 and UNI-N 18. UNI-N 16 has a TNE (transport network address of an entity) of "TNE-A" and UNI-N 168 has a TNE (transport network address of an entity) of "TNE-B". A TNA (transport network assigned) address of "TNA-A" identifies the links between the ingress UNI-C 12 and UNI-N 16. Similarly, "TNA-B" identifies the links between the ingress UNI-C 12 and UNI-N 18.

A first path is established between ingress UNI-C 12 and egress UNI-C 14 through ingress UNI-N 16. This path is shown as "Connection-A". Multiple-homing route diversification provides for another path to be established between the ingress and egress UNI-Cs. A sample of the path is shown in FIG. 1 as "Connection-B".

Typically, the customer wishing to provide communication between the ingress and egress UNI-Cs has no information concerning the configuration of the transport network 10. From the standpoint of the ingress UNI-C 12, only the connections to the ingress UNI-Ns 16 and 18 are known. Without more information, it is not possible to determine alternate routes through the transport network 10.

Figure 2:
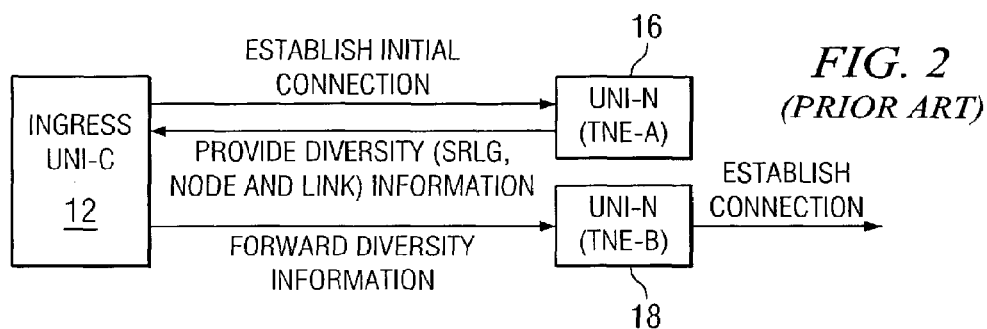
FIG. 2 illustrates a block diagram of a proposed prior art method for establishing a diversification path based on an existing path.

FIG. 2 illustrates a block diagram of a proposed method for establishing a diversification path based on an existing path. To illustrate this method, the connections shown in FIG. 1 are used as an example.

Initially, Connection-A is established through the transport network through UNI-N 16. The connection may involve other intermediary UNI-Ns in the transport network. Once the connection is established, diversification information including SRLG (shared link risk group), node and link information, is passed from UNI-N 16 to ingress UNI-C 12. Ingress UNI-C passes this information to UNI-N 18. UNI-N 18 establishes the new connection (Connection-B).

This proposal is unacceptable to many service providers, since the diversity information could compromise the security of their network.

Figure 3:
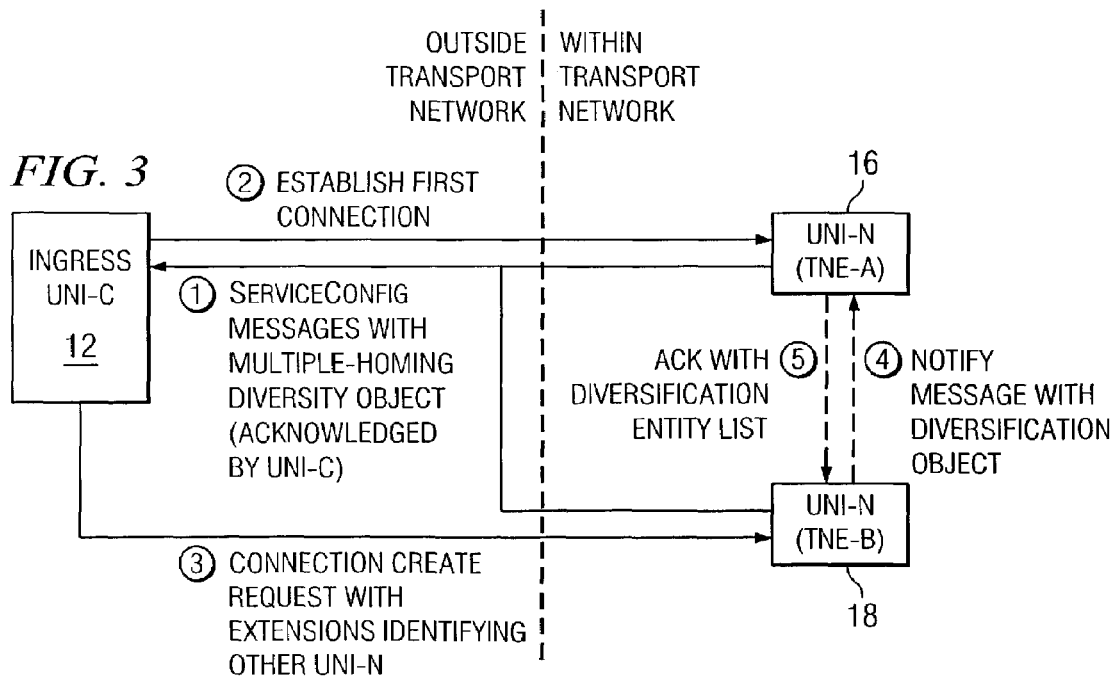
FIG. 3 illustrates a block diagram describing operation of a system for generating multiple-homing diversification routes without transmitting proprietary information out of the transport network.

FIG. 3 illustrates a block diagram describing operation of a system, compatible with UNI, for generating multiple-homing diversification routes without transmitting proprietary information out of the transport network 10. Upon initiation of the network 10, prior to establishing any link through the network 10, each ingress UNI-N (shown as UNI-N's 16 and 18) coupled to the ingress UNI-C 12 transmits a ServiceConfig message, similar to a UNI 1.0 ServiceConfig message, but with an extended Diversity object (discussed in greater detail in connection with FIG. 4). As a response, the UNI-C sends a ServiceConfig ACK (acknowledgement) or NACK (negative acknowledgement). An first connection between the ingress UNI-C 12 and the egress UNI-C 14 is established through the UNI-N 16. This connection may be generated by conventional means.

The ingress UNI-C 12 initiates creation of a diversification route by making a connection create request to another UNI-N, in this case UNI-N 18 using a UNI Connection Create Request message, defined in UNI 1.0, with extensions. The UNI-C 12 could make the extended Connection Create Request to any UNI-N to which it is connected. The extensions provide information on the ingress UNI-N through which the initial connection was made, in this case, UNI-N 16 to the diversity UNI-N, in this case UNI-N 18. A UNI 1.0 Connection Create Request includes a diversity object (which provides a set of node, link and SRLG diversity); in the present invention, the Connection Create Request includes an extended diversity object, which provides for multiple-homing route diversification. The extended Connection Create Request is shown in greater detail in connection with FIG. 5.

Upon receiving the extended Connection Create Request, UNI-N 18 sends a Notify message to the initial ingress UNI-N 16. If UNI-N 16 and UNI-N 18 are not directly connected, this message may be transmitted hop-by-hop through other network elements in the transport network 10. The Notify message is discussed in greater detail in connection with FIG. 6.

The initial UNI-N 16 responds to the Notify message using with an acknowledge (ACK) message with an embedded diversification entity list (node list, link list or SRLG list) with the information needed to create a diversification route. The ACK message is described in connection with FIG. 7.

Using the information provided in the ACK message, the diversity ingress UNI-N 18 generates a diversification connection (Connection-B).

Figure 4:
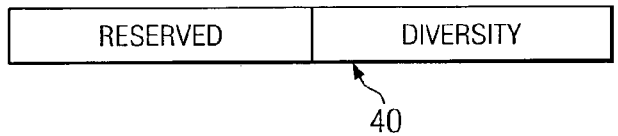
FIG. 4 illustrates a diversity object used to pass information regarded diversity types supported by the transport network.

Referring to FIG. 4, the extended diversity object 40 is shown. The diversity object 40 indicates the network routing diversity capabilities provided by the network transport network. This object is sent from a UNI-N to a UNI-C prior to establishing a link through the network 10. The extended diversity object 40 includes multi-homing diversity types in addition to the node, link and SRLG diversity provided in UNI 1.0. Table 1 illustrates an example of how the diversity object may be structured.

TABLE 1

Diversity Object Flags (Bits)

| Flag (Bit) Position | Diversity Type (0: not supported, 1: supported) |
| --- | --- |
| 0 | Node diversity |
| 1 | Link diversity |
| 2 | SRLG diversity |
| 3 | Multiple-homing Node diversity |
| 4 | Multiple-Homing Link diversity |
| 5 | Multiple-Homing SRLG diversity |
| 6 | Multiple-Homing SRLG diversity |
| 7 | Reserved |

The diversity object may also have an N-bit, which is set to "0", indicating that the information in the diversity object is non-negotiable.

Figure 5:
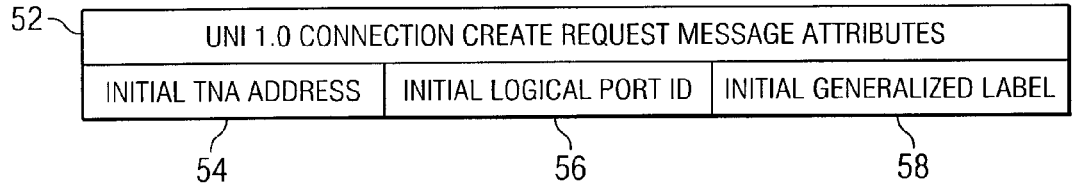
FIG. 5 illustrates Connection Create Request with extensions to identify a initial ingress network element.

Assuming that one of the multiple-homing diversity types (multiple-homing node, link or SRLG) is supported, then ingress UNI-C 12 sends an extended Connection Create Request 50, as shown in FIG. 5, to a diversity ingress UNT-N 18. The extended Connection Create Request 50 includes standard fields 52 of a UNI Connection Create Request plus additional fields that identify the initial UNI-N 16.

The standard fields 52 UNI 1.0 Connection Create Request shown in Table 2 are used by a client to request a connection between specified source and destination clients. The Connection Create Request additionally defines the set of attributes that describe the service requirements for the connection. The Connection Create Request is sent from: (Case 1) the initiating UNI-C to UNI-N to request the creation of a connection or (Case 2) the UNI-N to the terminating UNI-C to indicate an incoming connection request. The mandatory (M) and optional (O) attributes carried in this message are shown below. Not all of the attributes are applicable in each of the cases 1 (UNI-C→UNI-N) and 2 (UNI-N→UNI-C) above. The "Applicability" column indicates the case in which the corresponding parameter is applicable. As discussed above, in addition to the standard diversity types supported by a UNI 1.0 Connection Create Request (node diversity, link diversity and SRLG diversity), the extended Connection Create Request 50 also supports multiple-homing node diversity, multiple-homing link diversity and multiple-homing SRLG diversity.

TABLE 2

UNI 1.0 Connection Create Request

| Attributes | Applicability |
| --- | --- |
| Source TNA Address (M) | Cases 1 and 2 |
| Source Logical Port Identifier (M) | Case 1 |
| Source Generalized Label (O) | Case 1 |
| Destination TNA Address (M) | Cases 1 and 2 |
| Destination Logical Port Identifier (O) | Cases 1 and 2 |
| Destination Generalized Label (O) | Cases 1 and 2 |
| Local connection ID (M) | Cases 1 and 2 |
| Contract ID (O) | Case 1 |
| Encoding Type (M) | Cases 1 and 2 |
| SONET/SDH traffic parameters (M) | Cases 1 and 2 |
| Directionality (O) | Cases 1 and 2 |
| Generalized Payload Identifier (O) | Cases 1 and 2 |
| Service Level (O) | Cases 1 and 2 |
| Diversity (O) | Cases 1 and 2 |

The extended fields shown in FIG. 5 provide information that is known to the ingress UNI-C 12, such as the TNA Address 54 of the initial UNI-N 16, the Logical Port ID 56 of the initial UNI-N 16, and the Generalized Label 58 of the initial UNI-N 16. Using this information, the diversity ingress UNI-N 18 will determine the TNE address of the initial UNI-N 16 (TNE-A in FIG. 1).

Once the TNE address of the initial UNI-N 16 is determined, the information may be retrieved using signaling extensions, such as RSVP-TE or LDP. RSVP-TE abstract message extensions to support UNI 2.0 multiple homing diversification are described below.

A Notify message sent from the diversity ingress UNI-N 18 to the initial ingress UNI-N 16 to initiate the retrieval of diversification path information. In RSVP-TE, the Notify message provides a mechanism to inform non-adjacent nodes of LSP (label switched path) related events. Notify messages are normally generated only after a Notify Request object has been received. In the present embodiment, the new UNI-N generates the Notify message without any request message.

The Notify message may be sent either (a) normally, where intermediary nodes forward the Notify message to the initial UNI-N 16, similar to ResvConf processing in RSVP; or (b) encapsulated in a new IP header whose destination is equal to the initial UNI-N's IP address. Regardless of the transmission mechanism, nodes receiving a Notify message not destined to the node forward the message, unmodified, towards the target (initial ingress UNI-N 16).

In the preferred embodiment, the Notify message is a generalized notification message. The IP destination address is set to the IP address of the intended target UNI-N. The Notify message format is as follows:

```
<Notify message> ::=    <Common Header> [<INTEGRITY>]
                        [ [<MESSAGE_ID_ACK> | <MESSAGE_ID_NACK>] ... ]
                        [<Diversification Object>]
                        [<MESSAGE_ID>]
                        <ERROR_SPEC> <notify session list>
```

Objects other than the embedded diversification object can be the same as for the GMPLS-RSVP-TE Notify message.

Figure 6:
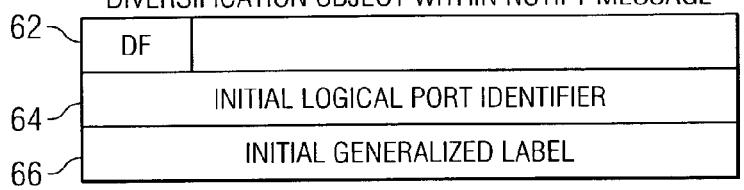
FIG. 6 illustrates a preferred embodiment for a Diversification Object identifying an initial connection, which may be embedded in a Notify message.
Figure 7:
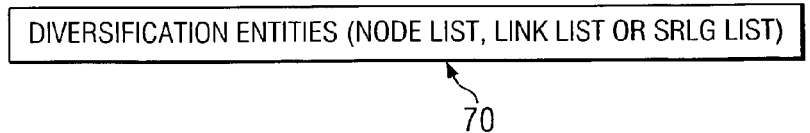
FIG. 7 illustrates a Diversification Entity List, which may be embedded in an ACK message.

FIG. 6 illustrates a preferred embodiment for the embedded Diversification Object 60. A diversification flag (DF) 62 indicates the type of diversification desired. The diversification flag could be, for example, a three bit flag, where one bit is set to indicate the desired diversity type: "001" for multiple-homing node diversity, "010" for multiple-homing link diversity, and "100" for multiple-homing SRLG diversity. An Initial Logical Port ID field 64 and an Initial Generalized Label field 66 pass the information received in the Connection Create Request (fields 56 and 58, respectively). This information identifies the initial connection (Connection-A) for the initial UNI-N 16, so that it may respond with the appropriate diversification information.

An ACK message is used by the initial UNI-N 16 to acknowledge receipt of the Notify message from UNI-N 18. In the preferred embodiment, the ACK message includes an embedded Diversification Entity List 70, shown in FIG. 7, which includes a list of the entities used in the initial connection (Connection-A). Depending upon the type of diversity requested in the DF field 62, the list may be a node list, a link list or a SRLG list.

Once the ACK message is received, the diversity UNI-N can generate a new diversification connection (Connection-B) which supports the desired diversity type.

The present invention provides significant advantages over the prior art. Importantly, multiple-homing route diversification is supported without releasing network-related information outside of the transport network 10. The network-related information only passes internally between network elements of the transport network 10. Further, the preferred embodiment does not create new UNI message types; instead, extensions are provided to defined objects within the UNI interface. A few new objects are defined for the RSVP-TE domain within the NNI (network to network interface).

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. A method for generating multiple-homing diversification routes in a transport network, between an ingress client node and an egress client node, without transmitting proprietary information out of the transport network, comprising:

establishing a first path through the transport network between the ingress client node and the egress client node through a first ingress network element within the transport network;

initiating creation of a diversification path between the ingress client node and the egress client node through the transport network by transmitting a connection create request to a second ingress network element only within the transport network by the ingress client node, wherein the connection create request includes information identifying a first connection with the first ingress network element;

transmitting the information identifying the first connection from the second ingress network element to the first ingress network element, the transmitting the information occurring only within the transport network;

transmitting by the first ingress network element to the second ingress network element information associated with the first path only through the transport network; and establishing the diversification path through the transport network responsive to the information associated with the first path.

2. The method of claim 1, further comprising the step of:

determining by the second ingress network element an address associated with the first ingress network element from the information identifying the first connection with the first ingress network element and the ingress client node in the connection create request.

3. The method of claim 2 wherein the step of transmitting by the first ingress network element to the second ingress network element information associated with the first path through the transport network comprises transmitting information identifying entities used in the first path.

4. The method of claim 2 wherein the step of transmitting by the first ingress network element to the second ingress network element information associated with the first path through the transport network comprises transmitting information identifying entities used in the first path responsive to a selected diversity type.

5. The method of claim 2 wherein the step of transmitting by the first ingress network element to the second ingress network element information associated with the first path through the transport network comprises transmitting information identifying entities used in the first path in an acknowledgment message.

6. A transport network connected to a first client node and a second client node, comprising:
 a first ingress network element in the transport network connected to the first client node over a first connection and connected to a first egress network element in the transport network by a first path through the transport network wherein the first egress network element is connected to the second client node;
 a second ingress network element in the transport network connected to the first client node by a second connection, wherein the second ingress network element is operable to:
  receive a request for a second path through the transport network, wherein the request includes information relating to the first connection;
  transmit information, only within the transport network, about the first connection to the first ingress network element;
  receive information about the first path through the transport network; and
  establish a second path through the transport network in response to the information about the first path through the transport network.

7. The transport network of claim 6 wherein the second ingress network element is operable to establish the second path as diverse from the first path in response to the information about the first path through the transport network.

8. The transport network of claim 7 wherein the second ingress network element is operable to determine and address associated with the first ingress network element from the information relating to the first connection.

9. The transport network of claim 8 wherein the information about the first path comprises information identifying entities used in the first path.

10. The transport network of claim 8 wherein the information about the first path comprises information identifying entities used in the first path responsive to a selected diversity type.

* * * * *